United States Patent
Inoue et al.

(10) Patent No.: US 8,272,209 B2
(45) Date of Patent: Sep. 25, 2012

(54) EXHAUST GAS PURIFICATION SYSTEM FOR INTERNAL COMBUSTION ENGINE

(75) Inventors: Mikio Inoue, Susono (JP); Akinori Morishima, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/449,587

(22) PCT Filed: Feb. 25, 2008

(86) PCT No.: PCT/JP2008/053705
§ 371 (c)(1),
(2), (4) Date: Aug. 14, 2009

(87) PCT Pub. No.: WO2008/105544
PCT Pub. Date: Sep. 4, 2008

(65) Prior Publication Data
US 2010/0115922 A1    May 13, 2010

(30) Foreign Application Priority Data
Feb. 23, 2007    (JP) ................... 2007-043416

(51) Int. Cl.
*F01N 3/00* (2006.01)
(52) U.S. Cl. .................................... 60/295; 60/301

(58) Field of Classification Search ............. 60/285, 60/286, 295, 301
See application file for complete search history.

(56) References Cited

U.S. PATENT DOCUMENTS

| | | | |
|---|---|---|---|
| 6,336,320 B1 * | 1/2002 | Tanaka et al. | 60/285 |
| 2004/0154288 A1 * | 8/2004 | Okada et al. | 60/286 |
| 2005/0120709 A1 * | 6/2005 | Ichise et al. | 60/285 |
| 2010/0242480 A1 * | 9/2010 | Ohashi | 60/689 |

FOREIGN PATENT DOCUMENTS

| | | | |
|---|---|---|---|
| JP | A-2003-269155 | | 9/2003 |
| JP | A-2004-176632 | | 6/2004 |
| JP | 2005226463 A | * | 8/2005 |
| JP | A-2005-226463 | | 8/2005 |
| JP | 2005291095 A | * | 10/2005 |
| JP | A-2005-291095 | | 10/2005 |
| JP | A-2006-214321 | | 8/2006 |

* cited by examiner

*Primary Examiner* — Thomas Denion
*Assistant Examiner* — Patrick Maines
(74) *Attorney, Agent, or Firm* — Oliff & Berridge, PLC (57) ABSTRACT

An object of the present invention is to reduce oxide stored in an NOx catalyst in a more preferable manner. According to the present invention, when oxide stored in the NOx catalyst is to be reduced, the combustion mode of the internal combustion engine is switched into a low air-fuel ratio mode in which the air-fuel ratio of the air-fuel mixture in the internal combustion engine is low, and supply of fuel is executed at a time when the air-fuel ratio of the exhaust gas has been made low by the switching of the combustion mode.

3 Claims, 6 Drawing Sheets

EXHAUST GAS PURIFICATION SYSTEM FOR INTERNAL COMBUSTION ENGINE

This application is the national phase application under 35 U.S.C. §371 of PCT international application No. PCT/JP2008/053705 filed on 25 Feb. 2008, which claims priority to Japanese patent application No. 2007-043416 filed on 23 Feb. 2007, the contents of which are incorporated herein by reference.

TECHNICAL FIELD

The present invention relates to an exhaust gas purification system for an internal combustion engine having an NOx storage reduction catalyst provided in the exhaust passage of the internal combustion engine.

BACKGROUND ART

In an exhaust gas purification system for an internal combustion engine having an NOx storage reduction catalyst (which will be simply referred to as the "NOx catalyst" hereinafter) provided in an exhaust passage of the internal combustion engine, NOx contained in the exhaust gas is stored in the NOx catalyst when the air-fuel ratio of the exhaust gas is relatively high and the ambient atmosphere of the NOx catalyst is an oxidizing atmosphere. In this case, not only NOx but also SOx contained in the exhaust gas is stored in the NOx catalyst.

When oxide (i.e. NOx or SOx) stored in the NOx catalyst is to be reduced, it is necessary to decrease the air-fuel ratio of the exhaust gas flowing into the NOx catalyst (which will be hereinafter referred to as the "inflowing exhaust gas") to a level that enables reduction of the oxide to be reduced.

Japanese Patent Application Laid-Open No. 2003-269155 discloses a technology in which when a reducing agent is added to the exhaust gas in order to decrease the air-fuel ratio of the inflowing exhaust gas when reducing NOx, the intake air quantity is decreased by controlling the degree of opening of an intake throttle valve and/or EGR valve. The air-fuel ratio of air-fuel mixture in an internal combustion engine can be decreased by decreasing the intake air quantity, whereby the air-fuel ratio of the exhaust gas can be decreased.

DISCLOSURE OF THE INVENTION

When oxide stored in an NOx catalyst is reduced, if a reducing agent is supplied to the exhaust gas after the air-fuel ratio of the exhaust gas has been decreased by switching the combustion mode of the internal combustion engine into a combustion mode (which will be hereinafter referred to as the "low air-fuel ratio mode") in which the air-fuel ratio of the air-fuel mixture in the internal combustion engine is lower than that during the time in which reduction of oxide is not performed, thereby further decreasing the air-fuel ratio of the inflowing exhaust gas, the oxide can be reduced more efficiently.

When the air-fuel ratio of the exhaust gas is to be decreased by switching the combustion mode of the internal combustion engine into the low air-fuel ratio mode, there is a certain degree of response delay from the start of the combustion mode change to the actual decrease in the air-fuel ratio of the exhaust gas. For this reason, if the reducing agent is to be supplied to the exhaust gas having a decreased air-fuel ratio, it is necessary to change the combustion mode of the internal combustion engine into the low air-fuel ratio mode prior to supplying the reducing agent to the exhaust gas. However, if the period over which the combustion mode of the internal combustion engine is kept in the low air-fuel ratio mode becomes unduly long, there is a risk that a decrease in fuel economy, an increase in harmful exhaust emission, and an increase in combustion noise may occur.

The present invention has been made in view of the above-described problem and has as an object to provide a technology that enables improved reduction of oxide stored in an NOx catalyst.

According to the present invention, when oxide stored in an NOx catalyst is to be reduced, the combustion mode of the internal combustion engine is switched into a low air-fuel ratio mode, and supply of reducing agent to the exhaust gas is executed at a time when the air-fuel ratio of the exhaust gas has been made low by the aforementioned switching of the combustion mode.

More specifically, an exhaust gas purification system for an internal combustion engine according to the present invention is characterized in comprising:

an NOx storage reduction catalyst provided in an exhaust passage of the internal combustion engine;

combustion mode switching unit for switching a combustion mode of said internal combustion engine into a low air-fuel ratio mode in which the air-fuel ratio of air-fuel mixture in said internal combustion engine is low;

reducing agent supply unit for supplying reducing agent to exhaust gas flowing in said exhaust passage upstream of said NOx storage reduction catalyst; and reduction execution unit for executing a reduction control to reduce oxide stored in said NOx storage reduction catalyst, wherein said reduction execution unit executes the reduction control by switching the combustion mode of said internal combustion engine into the low air-fuel ratio mode by said combustion mode switching unit and executing supply of reducing agent by said reducing agent supply unit at a time when the air-fuel ratio of the exhaust gas has been made low by the switching of the combustion mode.

Here, the low air-fuel ratio mode is a combustion mode in which the air-fuel ratio of the air-fuel mixture in the internal combustion engine is lower than that in a normal combustion mode in which reduction of oxide stored in the NOx catalyst is not performed. When the combustion mode of the internal combustion engine is the normal combustion mode, the air-fuel ratio of the air-fuel mixture in the internal combustion engine may be set based on the operation state of the internal combustion engine. According to the present invention, when the reduction control is executed, supply of reducing agent to the exhaust gas by the reducing agent supply unit is executed in synchronization with the time when the air-fuel ratio of the exhaust gas has been decreased by switching of the combustion mode of the internal combustion engine into the low air-fuel ratio mode. Thus, while the period during which the combustion mode of the internal combustion engine is set to the low air-fuel ratio mode can be made as short as possible, the air-fuel ratio of the inflowing exhaust gas can be made sufficiently low.

Therefore, the present invention enables reduction of oxide stored in the NOx catalyst while preventing a decrease in fuel economy, an increase in harmful exhaust emission, and an increase in combustion noise from being caused by unduly long duration of the period over which the combustion mode of the internal combustion engine is kept in the low air-fuel ratio mode. Thus, oxide stored in the NOx catalyst can be reduced in a more preferable manner.

In the present invention, in the case where the reduction execution unit is unit for executing an NOx reduction control to reduce NOx stored in the NOx catalyst, the system may further comprise integrated NOx discharge amount calculation unit for calculating an integrated NOx discharge amount defined as an integrated amount of the quantity of NOx discharged from the internal combustion engine since the time of last execution of the NOx reduction control, and prediction unit for predicting, based on the decrease rate of the difference between the integrated NOx discharge amount and a specific NOx discharge amount serving as a threshold of execution of the NOx reduction control, a specific time defined as a time at which the integrated NOx discharge amount reaches the specific NOx discharge amount. In this case, the reduction execution unit may switch the combustion mode of the internal combustion engine into the low air-fuel ratio mode by the combustion mode switching unit with such timing, prior to the specific time predicted by the prediction unit, as to make the air-fuel ratio of the exhaust gas low at the specific time, and execute supply of reducing agent by the reducing agent supply unit at the specific time.

After NOx stored in the NOx catalyst has been once reduced by execution of the NOx reduction control, the amount of NOx stored in the NOx catalyst increases again as the integrated NOx discharge amount increases with the lapse of time. Here, the specific NOx discharge amount is such a value that allows a determination that the amount of NOx stored in the NOx catalyst reaches a threshold of execution of the NOx reduction control if the integrated NOx discharge amount reaches this specific NOx discharge amount.

As the integrated NOx discharge amount increases, the difference between the integrated NOx discharge amount and the specific NOx discharge amount decreases gradually. Therefore, the specific time or the time at which the integrated NOx discharge amount reaches the specific NOx discharge amount can be predicted based on the decrease rate of the difference between them.

In the above described process, in view of a response delay from the time when the combustion mode of the internal combustion engine is switched to the low air-fuel ratio mode to the time when the air-fuel ratio of the exhaust gas actually becomes low, the switching of the combustion mode is executed with such timing, prior to the specific time predicted by the prediction unit, as to make the air-fuel ratio of the exhaust gas low at the specific time. In addition, supply of reducing agent by the reducing agent supply unit is executed at the specific time. The response delay time from the time when the combustion mode of the internal combustion engine is switched to the low air-fuel ratio mode to the time when the air-fuel ratio of the exhaust gas actually becomes low can be determined in advance by, for example, experiments.

Thus, supply of reducing agent to the exhaust gas by the reducing agent supply unit can be executed in synchronization with the time when the air-fuel ratio of the exhaust gas is made low by the switching of the combustion mode of the internal combustion engine into the low air-fuel ratio mode. In addition, the air-fuel ratio of the inflowing exhaust gas can be made sufficiently low in synchronization with the time when the integrated NOx discharge amount reaches the specific NOx discharge amount, whereby NOx stored in the NOx catalyst can be reduced.

The system according to the present invention may be further provided with specific NOx discharge amount setting unit for setting the specific NOx discharge amount in accordance with an operation state of the internal combustion engine. In this case, when the operation state of the internal combustion engine is a transitional operation state, the specific NOx discharge amount also changes along with the quantity of discharged NOx. In this case, there is a possibility that the rate of decrease in the difference between the integrated NOx discharge amount and the specific NOx discharge amount may increase abruptly. Such an abrupt change in the decrease rate of the difference between the integrated NOx discharge amount and the specific NOx discharge amount makes it difficult to predict the specific time accurately based on this decrease rate.

In view of the above, in the above described case, switching of the combustion mode of the internal combustion engine into the low air-fuel ratio mode by the reduction execution unit may be disabled when the decrease rate of the difference between the integrated NOx discharge amount and the specific NOx discharge amount is equal to or higher than a specific rate. Here, the specific rate is a threshold at which it can be determined that the internal combustion engine is in a transitional operation state, and the decrease rate of the difference between the integrated NOx discharge amount and the specific NOx discharge amount has increased so abruptly that it is difficult to predict the specific time accurately based on the decrease rate.

With the above feature, switching of the combustion mode is prevented from being executed in the case where the time when the air-fuel ratio of the exhaust gas becomes low will not be synchronous with the time when the integrated NOx discharge amount reaches the specific NOx discharge amount even if the combustion mode of the internal combustion engine is switched into the low air-fuel ratio mode.

In the present invention, in the case where the reduction execution unit is unit for executing an NOx reduction control to reduce NOx stored in the NOx catalyst, and the system further comprises integrated NOx discharge amount calculation unit for calculating the integrated NOx discharge amount, the reduction execution unit may switch the combustion mode of the internal combustion engine into the low air-fuel ratio mode by the combustion mode switching unit at a time when the integrated NOx discharge amount has reached the specific NOx discharge amount, and thereafter executes supply of reducing agent by the reducing agent supply unit at a time when the air-fuel ratio of the exhaust gas has become low.

By this process also, supply of reducing agent to the exhaust gas by the reducing agent supply unit can be executed in synchronization with the time when the air-fuel ratio of the exhaust gas has been made low by the switching of the combustion mode of the internal combustion engine into the low air-fuel ratio mode.

In the present invention, in the case where the reduction execution unit is unit for executing an SOx reduction control to reduce SOx stored in said NOx catalyst, the system may further be provided with integrated oxidized reducing agent amount calculation unit for calculating an integrated oxidized reducing agent amount defined as an integrated amount of the quantity of reducing agent oxidized in the NOx catalyst since the time of last execution of the SOx reduction control, integrated required reducing agent amount calculation unit for calculating an integrated required reducing agent amount defined as an integrated amount of the quantity of reducing agent that needs to be oxidized in the NOx catalyst in order to make the temperature of the NOx catalyst equal to a target temperature since the time of last execution of the SOx reduction control, and prediction unit for predicting a specific time defined as a time at which the integrated oxidized reducing agent amount and the integrated required reducing agent amount become equal to each other based on the decrease rate of the difference between the integrated oxidized reducing agent amount and the integrated required reducing agent amount. In this case, the reduction execution unit may switch the combustion mode of the internal combustion engine into the low air-fuel ratio mode by the combustion mode switching unit with such timing, prior to the specific time predicted by said prediction unit, as to make the air-fuel ratio of the exhaust gas low at the specific time, and execute supply of reducing agent by the reducing agent supply unit at the specific time.

When SOx stored in the NOx catalyst is to be reduced, it is necessary to decrease the air-fuel ratio of the inflowing exhaust gas and to raise the temperature of the NOx catalyst. The temperature of the NOx catalyst is raised by oxidation heat generated by oxidation of reducing agent in the NOx catalyst. Here, the target temperature is a value that allows a determination that SOx stored in the NOx catalyst is reduced by executing the SOx reduction control to make the air-fuel ratio of the inflowing exhaust gas sufficiently low if the average temperature of the NOx catalyst during the execution period of the SOx reduction control and during the suspension period of the SOx reduction control is equal to the target temperature.

During the execution period of the SOx reduction control, the integrated oxidized reducing agent amount increases steeply. During the suspension period of the SOx reduction control, although supply of reducing agent to the exhaust gas by the reducing agent supply unit is not executed, reducing agent that had adhered to the NOx catalyst during the execution period of the SOx reduction control is oxidized. For this reason, the integrated oxidized reducing agent amount increases also during the suspension period of the SOx reduction control, as long as oxidation of the reducing agent adhering on the NOx catalyst proceeds. However, the increase rate of the integrated oxidized reducing agent amount during the suspension period of the SOx reduction control is much smaller than that during the execution period of the SOx reduction control.

During the execution period of the SOx reduction control, the temperature of the NOx catalyst rises steeply from a temperature lower than the target temperature to become higher than the target temperature. Thereafter, the temperature of the NOx catalyst falls gradually during the suspension period of the SOx reduction control to become lower than the target temperature. After execution of the SOx reduction control has been started, the integrated required reducing agent amount increases gradually during the execution period of the SOx reduction control and during the suspension period of the SOx reduction control.

As the integrated oxidized reducing agent amount and the integrated required reducing agent amount change in the above described manner, the difference between the integrated oxidized reducing agent amount and the integrated required reducing agent amount decreases gradually during the suspension period of the SOx reduction control. At the time when the integrated oxidized reducing agent amount and the integrated required reducing agent amount become equal to each other, SOx stored in the NOx catalyst is reduced if the air-fuel ratio of the exhaust gas is low and reducing agent is supplied by the reducing agent supply unit.

In view of the above, according to the present invention, the specific time defined as the time at which the integrated oxidized reducing agent amount and the integrated required reducing agent amount become equal to each other is predicted based on the decrease rate of the difference between the integrated oxidized reducing agent amount and the integrated required reducing agent amount. In view of a response delay from the time when the combustion mode of the internal combustion engine is switched to the low air-fuel ratio mode to the time when the air-fuel ratio of the engine exhaust gas actually becomes low, the switching of the combustion mode is executed with such timing, prior to the specific time predicted by said prediction unit, as to make the air-fuel ratio of the exhaust gas low at the specific time. In addition, supply of reducing agent by the reducing agent supply unit is executed at the specific time.

Thus, supply of reducing agent to the exhaust gas by the reducing agent supply unit can be executed in synchronization with the time when the air-fuel ratio of the exhaust gas is made low by the switching of the combustion mode of the internal combustion engine into the low air-fuel ratio mode, in a manner similar to the above-described NOx reduction control. Furthermore, the average temperature of the NOx catalyst during the execution period of the SOx reduction control and the suspension period of the SOx reduction control can be made equal to the target temperature, and the air-fuel ratio of the inflowing exhaust gas can be made sufficiently low at the time when the integrated oxidized reducing agent amount and the integrated required reducing agent amount become equal to each other, whereby SOx stored in the NOx catalyst can be reduced.

THE BEST MODE FOR CARRYING OUT THE INVENTION

In the following, specific embodiments of the exhaust gas purification system for an internal combustion engine according to the present invention will be described with reference to the drawings.

Embodiment 1

Figure 1:
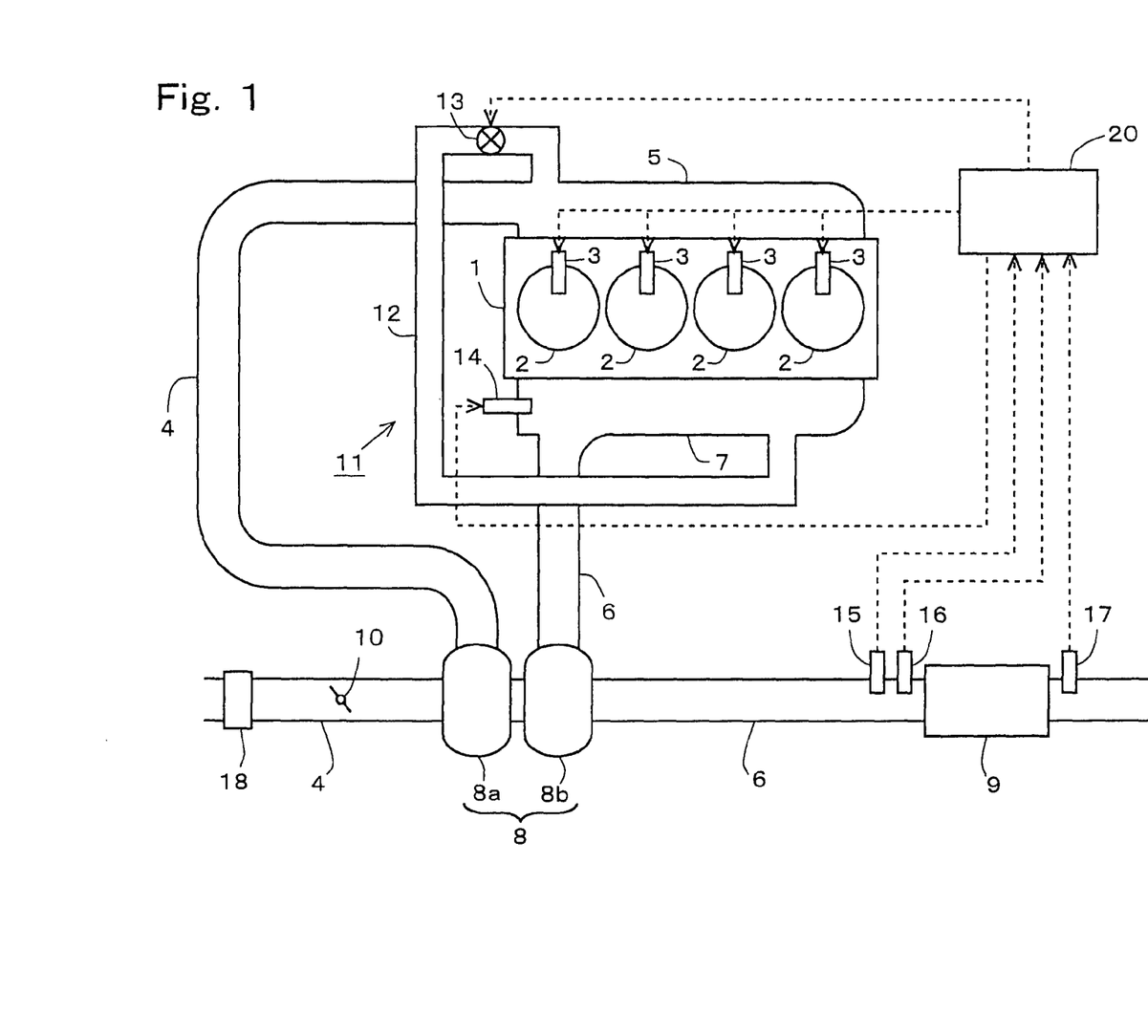
FIG. 1 is a diagram showing the general configuration of an internal combustion engine according to embodiment 1 and its air-intake and exhaust system.

General Configuration of Internal Combustion Engine and Air-Intake and Exhaust System Thereof FIG. 1 is a diagram showing the general configuration of an internal combustion engine and the air-intake and exhaust system thereof according to this embodiment. The internal combustion engine 1 is a diesel engine for driving a vehicle and has four cylinders 2. Each cylinder 2 is provided with a fuel injection valve 3 that injects fuel directly into the cylinder 2.

To the internal combustion engine 1 are connected an intake manifold 5 and an exhaust manifold 7. To the intake manifold 5 is connected an end of an intake passage 4. To the exhaust manifold 7 is connected an end of an exhaust passage 6. The exhaust manifold 7 is provided with a fuel addition valve 14 that adds fuel to the exhaust gas. In this embodiment, the fuel addition valve 14 corresponds to the reducing agent supply unit according to the present invention.

A compressor 8a of a turbocharger (or supercharger) 8 is provided in the intake passage 4. A turbine 8b of the turbocharger 8 is provided in the exhaust passage 6.

An air flow meter 18 and a throttle valve 10 are provided upstream of the compressor 8a in the intake passage 4. An NOx catalyst 9 is provided downstream of the turbine 8b in the exhaust passage 6. An air-fuel ratio sensor 15 that senses the air-fuel ratio of the exhaust gas and an upstream temperature sensor 16 that senses the temperature of the exhaust gas are provided downstream of the turbine 8b and upstream of the NOx catalyst 9 in the exhaust passage 6. A downstream temperature sensor 17 that senses the temperature of the exhaust gas is provided downstream of the NOx catalyst 9 in the exhaust passage 6.

The internal combustion engine 1 according to this embodiment is equipped with an EGR apparatus 11 that introduces a portion of the exhaust gas into the intake system as EGR gas. The EGR apparatus 11 is provided with an EGR passage 12, one end of which is connected to the exhaust manifold 7, and the other end of which is connected to the intake manifold 5. The EGR gas is introduced from the exhaust manifold 7 into the intake manifold 5 through the EGR passage 12. The EGR passage 12 is provided with an EGR valve 13 that regulates the quantity of EGR gas introduced into the intake manifold 5.

To the internal combustion engine 1 is annexed an electronic control unit (ECU) 20. The ECU 20 is electrically connected with the air flow meter 18, the air-fuel ratio sensor 15, the upstream temperature sensor 16, and the downstream temperature sensor 17. Output signals of them are input to the ECU 20. The ECU 20 estimates the temperature of the NOx catalyst 9 based on a value sensed by the temperature sensor 16.

The ECU 20 is electrically connected also with the throttle valve 10, the fuel injection valve 3, the fuel addition valve 14, and the EGR valve 13. Thus, these valves are controlled by the ECU 20.

<NOx Reduction Control>

In this embodiment, an NOx reduction control is executed in order to reduce NOx stored in the NOx catalyst 9. In the NOx reduction control according to this embodiment, the air-fuel ratio of the air-fuel mixture in the internal combustion engine 1 is decreased by increasing the quantity of EGR gas introduced into the intake manifold 5, whereby the air-fuel ratio of the exhaust gas discharged from the internal combustion engine 1 (which will be hereinafter referred to as the "engine exhaust gas") is decreased. Furthermore, fuel serving as reducing agent is added through the fuel addition valve 14, whereby the air-fuel ratio of the inflowing exhaust gas flowing into the NOx catalyst 9 is further made lower than the air-fuel ratio of the engine exhaust gas. By decreasing the air-fuel ratio of the engine exhaust gas and further decreasing the air-fuel ratio of the inflowing exhaust gas by supplying fuel to the engine exhaust gas in this way, NOx stored in the NOx catalyst 9 can be reduced more efficiently.

Figure 2:
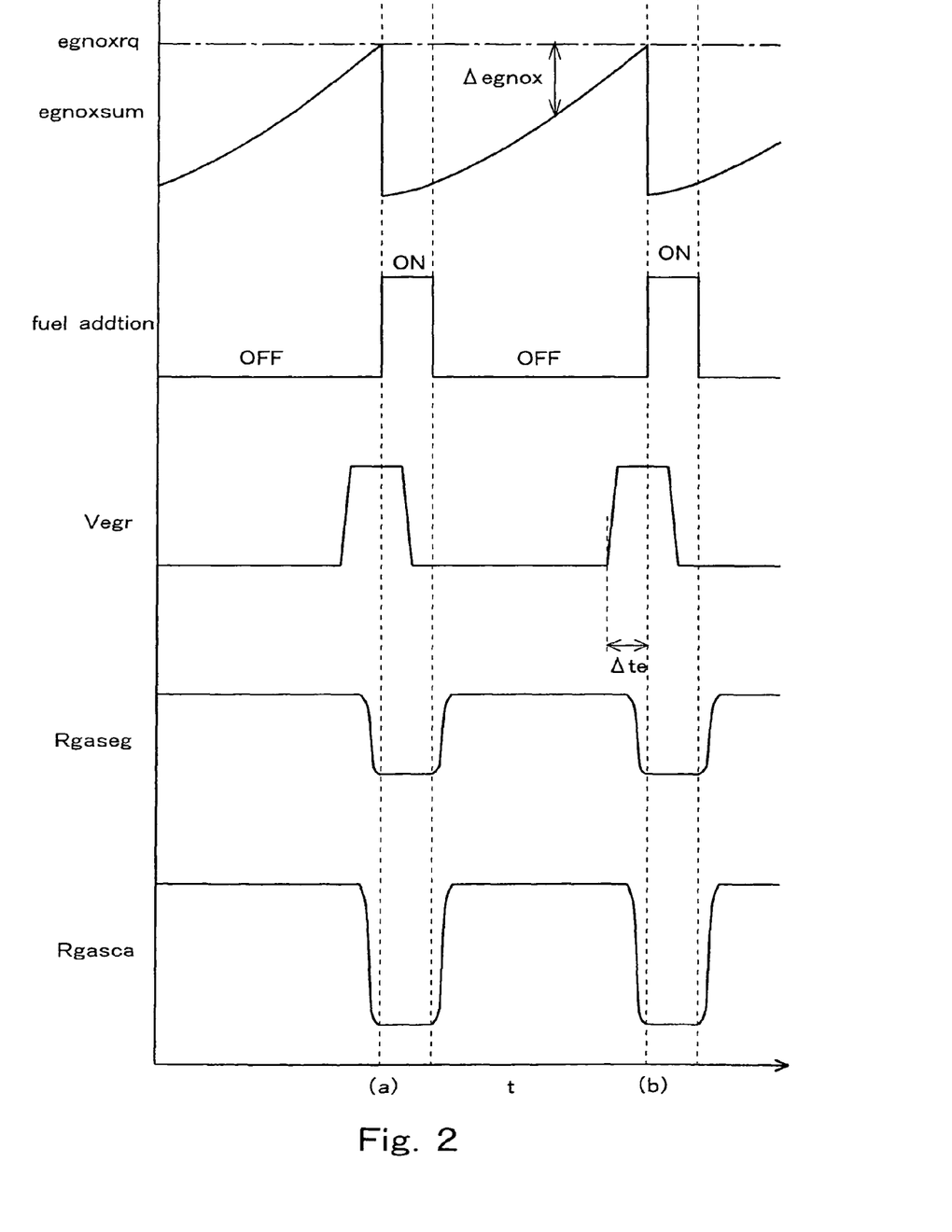
FIG. 2 is a time chart showing changes in the integrated value of the quantity of NOx discharged from the internal combustion engine, the presence/absence of fuel addition through a fuel addition valve, the degree of opening of an EGR valve, the air-fuel ratio of the engine exhaust gas, and the air-fuel ratio of the inflowing exhaust gas according to embodiment 1.

A more specific method of NOx reduction control according to this embodiment will be described with reference to a time chart shown in FIG. 2. FIG. 2 is a time chart showing changes in the integrated value egnoxsum of the quantity of NOx discharged from the internal combustion engine 1, the presence/absence of fuel addition by the fuel addition valve 14, the degree of opening Vegr of the EGR valve 13, the air-fuel ratio Rgaseg of the engine exhaust gas, and the air-fuel ratio Rgsca of the inflowing exhaust gas. FIG. 2 is a chart for a case where the operation state of the internal combustion engine 1 is in a stationary operation state.

In this embodiment, the quantity of NOx discharged from the internal combustion engine 1 is integrated since the time at which the NOx reduction control is executed, in other words, at the time at which NOx stored in the NOx catalyst 9 is reduced (i.e. at time (a) in FIG. 2). The quantity of NOx discharged from the internal combustion engine 1 can be estimated based on the intake air quantity and the fuel injection quantity etc.

The integrated NOx discharge amount egnoxsum defined as the integrated value of the quantity of discharged NOx increases with the lapse of time after time (a). As the integrated NOx discharge amount egnoxsum increases, the amount of NOx stored in the NOx catalyst 9 increases. When the integrated NOx discharge amount egnoxsum reaches a specific NOx discharge amount egnoxrq, it is determined that the amount of NOx stored in the NOx catalyst 9 has reached a threshold for executing the NOx reduction control.

In this embodiment, the specific NOx discharge amount egnoxrq is determined according to the operation state of the internal combustion engine 1. The higher the engine load of the internal combustion engine 1 is, the larger the quantity of NOx discharged from the internal combustion engine 1 is. Therefore, the higher the engine load of the internal combustion engine 1 is, the larger the specific NOx discharge amount egnoxrq is set to be. By making the specific NOx discharge amount egnoxrq larger, the suspension period of the NOx reduction control is prevented from becoming unduly short. As a result, deterioration in fuel economy caused by the execution of the NOx reduction control can be made small.

Here, the time at which the integrated NOx discharge amount egnoxsum reaches the specific NOx discharge amount egnoxrq will be referred to as the first specific time (time (b) in FIG. 2). In order for the air-fuel ratio Rgasca of the inflowing exhaust gas to become low at the first specific time, the EGR valve 13 is operated in the opening direction to increase the quantity of the EGR gas thereby reducing the air-fuel ratio of the air-fuel mixture in the internal combustion engine 1, and in addition fuel is added to the exhaust gas through the fuel addition valve 14.

As the air-fuel ratio of the air-fuel mixture in the internal combustion engine 1 decreases, the air-fuel ratio Rgaseg of the engine exhaust gas decreases. However, there is a response delay from the time when the EGR valve 13 is operated in the opening direction to the time when the air-fuel ratio of the engine exhaust gas becomes low. In view of this, in this embodiment, the first specific time is predicted based on the decrease rate of the difference Legnox between the integrated NOx discharge amount egnoxsum and the specific NOx discharge amount egnoxrq, before the integrated NOx discharge amount egnoxsum reaches the specific NOx discharge amount egnoxrq. The EGR valve 13 is operated in the opening direction at a time earlier than the predicted first specific time by a time equal to a response delay time Ate taken until the air-fuel ratio Rgaseg of the engine exhaust gas becomes low since the EGR valve 13 is operated in the opening direction. The response delay time Ate has been determined in advance by, for example, experiments.

Thus, a state in which the air-fuel ratio Rgaseg of the engine exhaust gas is low is achieved at the first specific time.

Then, addition of fuel to the exhaust gas through the fuel addition valve 14 is executed at the first specific time.

As a result, addition of fuel to the exhaust gas through the fuel addition valve 14 can be executed in synchronization with the time at which the air-fuel ratio Rgaseg of the engine exhaust gas is made low by operating the EGR valve 13 in the opening direction to increase the quantity of the EGR gas. In addition, the air-fuel ratio of the inflowing exhaust gas can be made sufficiently low at the time when the integrated NOx discharge amount egnoxsum reaches the specific NOx discharge amount egnoxrq, whereby the NOx stored in the NOx catalyst 9 can be reduced.

Thus, according to the present invention, while the period over which the air-fuel ratio of the air-fuel mixture in the internal combustion engine 1 is made low so as to decrease the air-fuel ratio of the Rgaseg of the engine exhaust gas can be made as short as possible, the air-fuel ratio Rgasca of the inflowing exhaust gas can be made sufficiently low. This enables reduction of NOx stored in the NOx catalyst 9 while preventing a decrease in fuel economy, an increase in harmful exhaust emission, and an increase in combustion noise from being caused by unduly long duration of the period over which the air-fuel ratio of the air-fuel mixture in the internal combustion engine 1 is made low.

<NOx Reduction Control During Transitional Operation>

As described above, in this embodiment the specific NOx discharge amount egnoxrq is set based on the operation state of the internal combustion engine 1. Therefore, when the internal combustion engine 1 is in a transitional operation state, the specific NOx discharge amount egnoxrq also changes along with the quantity of NOx discharged from the internal combustion engine 1. In this case, there is a possibility that the rate of decrease in the difference between the integrated NOx discharge amount egnoxsum and the specific NOx discharge amount egnoxrq may increase abruptly. Such an abrupt change in the decrease rate of the difference between the integrated NOx discharge amount egnoxsum and the specific NOx discharge amount egnoxrq makes it difficult to predict the first specific time accurately based on this decrease rate.

In view of this, in this embodiment, when the decrease rate of the difference between the integrated NOx discharge amount egnoxsum and the specific NOx discharge amount egnoxrq is equal to or higher than a specific rate, the operation of EGR valve 13 in the opening direction to decrease the air-fuel ratio of the air-fuel mixture in the internal combustion engine 1 is disabled. In other words, the operation of increasing the EGR gas quantity to decrease the air-fuel ratio Rgaseg of the engine exhaust gas is disabled. Here, the specific rate is a threshold at which it can be determined that the internal combustion engine is in a transitional operation state, and the decrease rate of the difference between the integrated NOx discharge amount and the specific NOx discharge amount has increased so abruptly that it is difficult to predict the first specific time accurately based on the decrease rate.

When the integrated NOx discharge amount egnoxsum reaches the specific NOx discharge amount egnoxrq, the air-fuel ratio Rgasca of the inflowing exhaust gas is reduced by executing only addition of fuel to the exhaust gas through the fuel addition valve 14. This also enables reduction of the NOx stored in the NOx catalyst 9. However, the efficiency of the NOx reduction is lower than that in the case where addition of fuel through the fuel addition valve 14 is executed while the air-fuel ratio Rgaseg of the engine exhaust gas is made low.

As per the above, the operation of the EGR valve 13 in the opening direction is prevented from being executed in the case where the time when the air-fuel ratio Rgaseg of the engine exhaust gas becomes low will not be synchronous with the time when the integrated NOx discharge amount egnoxsum reaches the specific NOx discharge amount egnoxrq even if the EGR gas quantity is increased to decrease the air-fuel ratio of the air-fuel mixture in the internal combustion engine 1.

In this embodiment, a combustion mode in which the EGR gas quantity is increased by operating the EGR valve 13 in the opening direction corresponds to the low air-fuel ratio mode according to the present invention. When the combustion mode of the internal combustion engine 1 is the normal combustion mode (namely when the NOx reduction control is not being performed), the degree of opening of the EGR valve 13 is set based on the operation state of the internal combustion engine 1. The combustion mode of the internal combustion engine 1 is changed into the low air-fuel ratio by making the degree of opening of the EGR valve 13 larger than the degree of opening that is set when the combustion mode of the internal combustion engine 1 is the normal combustion mode.

<NOx Reduction Control Routine>

Figure 3:
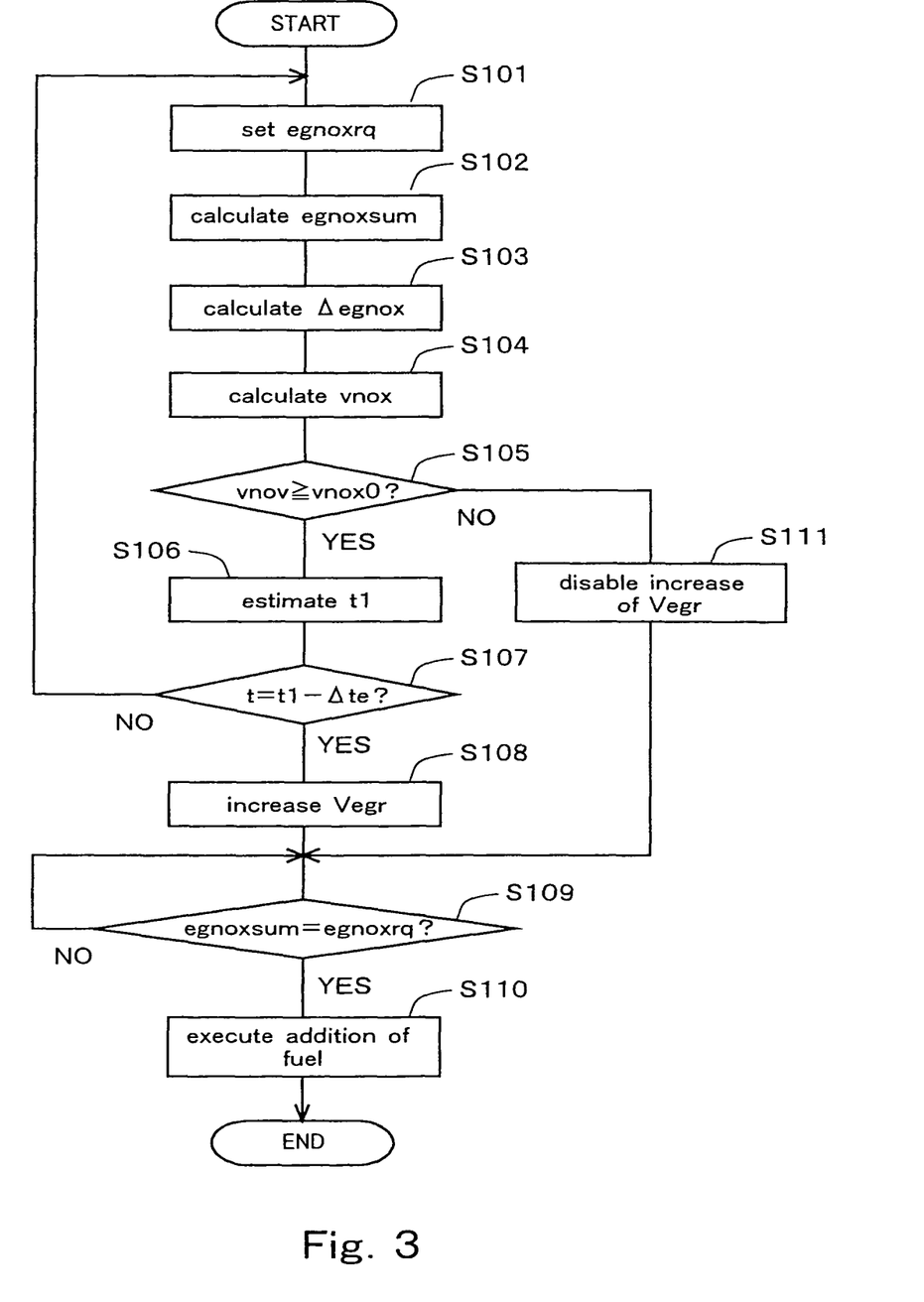
FIG. 3 is a flow chart of a routine of an NOx reduction control according to embodiment 1.

Here, a routine of the NOx reduction control according to this embodiment will be described with reference to the flow chart shown in FIG. 3. This routine is stored in the ECU 20 in advance, and executed at predetermined intervals during the operation of the internal combustion engine 1. In this embodiment, the ECU 20 that executes this routine corresponds to the reduction execution unit according to the present invention.

In this routine, first in step S101, the ECU 20 sets the specific NOx discharge amount egnoxrq based on the operation state of the internal combustion engine 1. In this embodiment, the ECU 20 that executes this step S101 corresponds to the specific NOx discharge amount setting unit according to the present invention.

Then, the ECU 20 proceeds to step S102, where it calculates the integrated NOx discharge amount egnoxsum. In this embodiment, the ECU 20 that executes this step S102 corresponds to the integrated NOx discharge amount calculation unit according to the present invention.

Then, the ECU 20 proceeds to step S103, where it subtracts the integrated NOx discharge amount egnoxsum from the specific NOx discharge amount egnoxrq to calculate the difference Δegnox between these values.

Then, the ECU 20 proceeds to step S104, where it calculates the decrease rate vnox of the difference Δegnox between the integrated NOx discharge amount egnoxsum and the specific NOx discharge amount egnoxrq (which rate will be simply referred to as the "decrease rate", hereinafter).

Then, the ECU 20 proceeds to step S105, where it determines whether or not the decrease rate vnox is equal to or higher than a specific rate vnox0. If the determination in step S104 is affirmative, the ECU 20 proceeds to step S106, and if the determination is negative, the ECU 20 proceeds to step S111.

In step S106, the ECU 20 estimates, based on the decrease rate vnox, the first specific time t1 or the time at which the integrated NOx discharge amount egnoxsum reaches the specific NOx discharge amount egnoxrq. In this embodiment, the ECU 20 that executes this step S106 corresponds to the prediction unit according to the present invention.

Then, the ECU 20 proceeds to step S107, where it determines whether or not the time earlier than the first specific time t1 estimated in step S106 by a time equal to the response delay time Δte taken until the air-fuel ratio Rgaseg of the engine exhaust gas becomes low after the EGR valve 13 is operated in the opening direction has been reached. If the determination in step S107 is affirmative, the ECU 20 proceeds to step S108, and if the determination is negative, the ECU 20 returns to step S101.

In step S108, the ECU 20 causes the degree of opening Vegr of the EGR valve 13 to increase. In other words, the ECU 20 operates the EGR valve 13 in the opening direction. This causes an increase in the quantity of the EGR gas introduced into the internal combustion engine 1, whereby the air-fuel ratio of the air-fuel mixture in the internal combustion engine 1 is decreased. In this embodiment, the ECU 20 that executes this step S108 corresponds to the combustion mode switching unit according to the present invention.

Then, the ECU 20 proceeds to step S109, where it determines whether or not the integrated NOx discharge amount egnoxsum has reached the specific NOx discharge amount egnoxrq. In other words, the ECU determines whether or not the first specific time has reached. If the determination in step S109 is affirmative, the ECU 20 proceeds to step S110, and if the determination is negative, the ECU 20 repeats the process of step S109.

In step S110, the ECU 20 executes addition of fuel to the exhaust gas through the fuel addition valve 14. Thereafter, the ECU 20 once terminates execution of this routine.

On the other hand, in step S111, the ECU 20 disables the operation of increasing the degree of opening of the EGR valve 13. In other words, the ECU 20 disables the operation of the EGR valve 13 in the opening direction. Then, the ECU 20 proceeds to step S109.

According to the above-described routine, when the air-fuel ratio of the air-fuel mixture in the internal combustion engine 1 is to be decreased in the NOx reduction control process by increasing the quantity of the EGR gas, the EGR valve 13 is operated in the opening direction with such timing, prior to the first specified time t1, as to make the air-fuel ratio Rgaseg of the engine exhaust gas low at the first specific time t1. Thus, the air-fuel ratio Rgaseg of the engine exhaust gas can be made low at the time when the integrated NOx discharge amount egnoxsum reaches the specific NOx discharge amount egnoxrq. In addition, addition of fuel through the fuel addition valve 14 can be executed in synchronization with the time when the air-fuel ratio Rgaseg of the engine exhaust gas becomes low.

Furthermore, when the operation state of the internal combustion engine 1 is a transitional operation, and the NOx decrease rate vnox has changed abruptly, the operation of increasing the EGR gas quantity is disabled, and the NOx reduction control is executed only by adding fuel to the exhaust gas through the fuel addition valve 14.

In this embodiment, when the NOx decrease rate vnox is equal to or higher than the specific rate vnox0, addition of fuel to the exhaust gas through the fuel addition valve 14 may also be disabled together with the operation of the EGR valve 13 in the opening direction. In other words, execution of the very NOx reduction control may be disabled. In this case, the NOx reduction control is executed after the operation state of the internal combustion engine 1 shifts from the transitional operation to the stationary operation.

Embodiment 2

The general configuration of the internal combustion engine according to this embodiment and its air-intake and exhaust system are the same as those in embodiment 1, and description thereof will be omitted. In the NOx reduction control according to this embodiment also, the air-fuel ratio of the air-fuel mixture in the internal combustion engine 1 is decreased by increasing the quantity of the EGR gas, whereby the air-fuel ratio of the engine exhaust gas is reduced, as is the case with embodiment 1. In addition, after the air-fuel ratio of the engine exhaust gas has been made low, fuel is added through the fuel addition valve 14, whereby the air-fuel ratio of the inflowing exhaust gas flowing into the NOx catalyst 9 is made further lower than the air-fuel ratio of the engine exhaust gas.

<NOx Reduction Control Routine>

Figure 4:
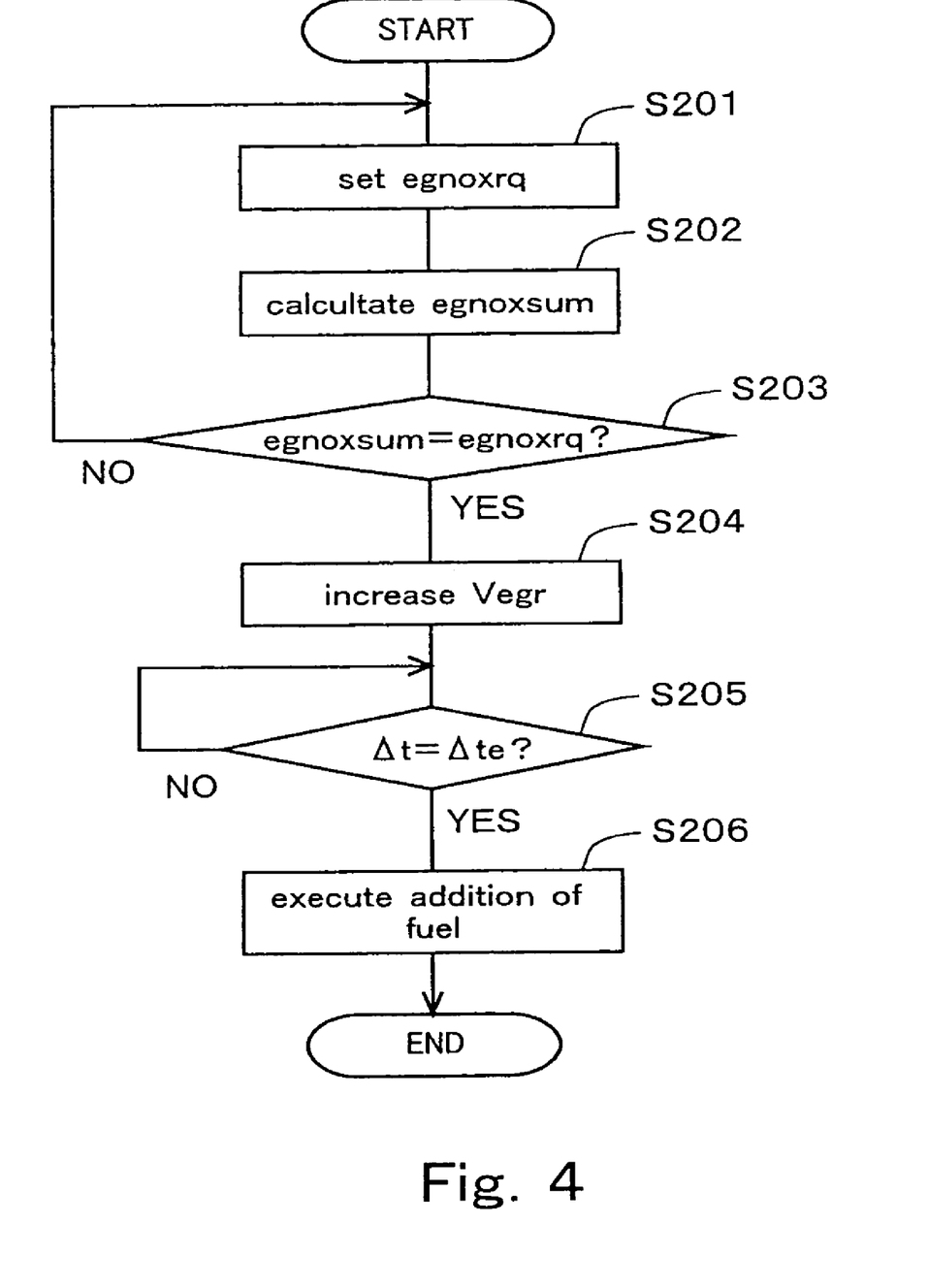
FIG. 4 is a flow chart of a routine of an NOx reduction control according to embodiment 2.

Here, a routine of the NOx reduction control according to this embodiment will be described with reference to the flow chart shown in FIG. 4. This routine is stored in the ECU 20 in advance, and executed at predetermined intervals during the operation of the internal combustion engine 1. In this embodiment, the ECU 20 that executes this routine corresponds to the reduction execution unit according to the present invention.

In this routine, first in step S201, the ECU 20 sets the specific NOx discharge amount egnoxrq based on the operation state of the internal combustion engine 1. In this embodiment, the ECU 20 that executes this step S201 corresponds to the specific NOx discharge amount setting unit according to the present invention.

Then, the ECU 20 proceeds to step S202, where it calculates the integrated NOx discharge amount egnoxsum. In this embodiment, the ECU 20 that executes this step S202 corresponds to the integrated NOx discharge amount calculation unit according to the present invention.

Then, the ECU 20 proceeds to step S203, where it determines whether or not the integrated NOx discharge amount egnoxsum has reached the specific NOx discharge amount egnoxrq. In other words, the ECU 20 determines whether or not the aforementioned first specific time t1 has been reached. If the determination in step S203 is affirmative, the ECU 20 proceeds to step S204, and if the determination is negative, the ECU 20 returns to step S201.

In step S204, the ECU 20 increases the degree of opening Vegr of the EGR valve 13. In other words, the ECU 20 operates the EGR valve 13 in the opening direction. This leads to an increase in the quantity of the EGR gas introduced into the internal combustion engine 1. In this embodiment, the ECU 20 that executes this step S204 corresponds to the combustion mode switching unit according to the present invention.

Then, the ECU 20 proceeds to step S205, where it determines whether or not the time Δt elapsed since the time of increase of the degree of opening Vegr of the EGR valve 13 has reached the response delay time Ate taken from the increase of the degree of opening Vegr of the EGR valve 13 to the decrease of the air-fuel ratio Rgaseg of the engine exhaust gas. If the determination in step S205 is affirmative, the ECU 20 proceeds to step S206, and if the determination is negative, the ECU 20 repeats the process of step S205.

In step S206, the ECU 20 executes addition of fuel to the exhaust gas through the fuel addition valve 14. Thereafter, the ECU 20 once terminates execution of this routine.

According to the above-described routine, the EGR valve 13 is operated in the opening direction at the time when the integrated NOx discharge amount egnoxsum reaches the specific NOx discharge amount egnoxrq, whereby the EGR gas quantity is increased. Then, addition of fuel to the exhaust gas through the fuel addition valve 14 is executed at the time when the response delay time Ate has elapsed after the operation of the EGR valve 13 in the opening direction.

This also enables execution of fuel addition through the fuel addition valve 14 synchronous with the timing of decrease in the air-fuel ratio Rgaseg of the engine exhaust gas, as is the case with embodiment 1.

Embodiment 3

The general configuration of the internal combustion engine according to this embodiment and its air-intake and exhaust system are the same as those embodiment 1, and description thereof will be omitted.

<SOx Reduction Control>

In this embodiment, an SOx reduction control is executed in order to reduce SOx stored in the NOx catalyst 9. When SOx stored in the NOx catalyst 9 is to be reduced, it is necessary to decrease the air-fuel ratio of the inflowing exhaust gas and to raise the temperature of the NOx catalyst 9. The temperature of the NOx catalyst 9 is raised by oxidation heat generated by oxidation of fuel contained in the exhaust gas in the NOx catalyst 9. In the SOx reduction control according to this embodiment, the air-fuel ratio of the air-fuel mixture in the internal combustion engine 1 is decreased by increasing the quantity of the EGR gas introduced into the intake manifold 5, whereby the air-fuel ratio of the engine exhaust gas, as with the NOx reduction control according to embodiments 1 and 2. Furthermore, the fuel is added through the fuel addition valve 14, whereby the air-fuel ratio of the inflowing exhaust gas flowing into the NOx catalyst 9 is further made lower than the air-fuel ratio of the engine exhaust gas, and fuel is supplied to the NOx catalyst 9. This enables more efficient reduction of SOx stored in the NOx catalyst 9.

Figure 5:
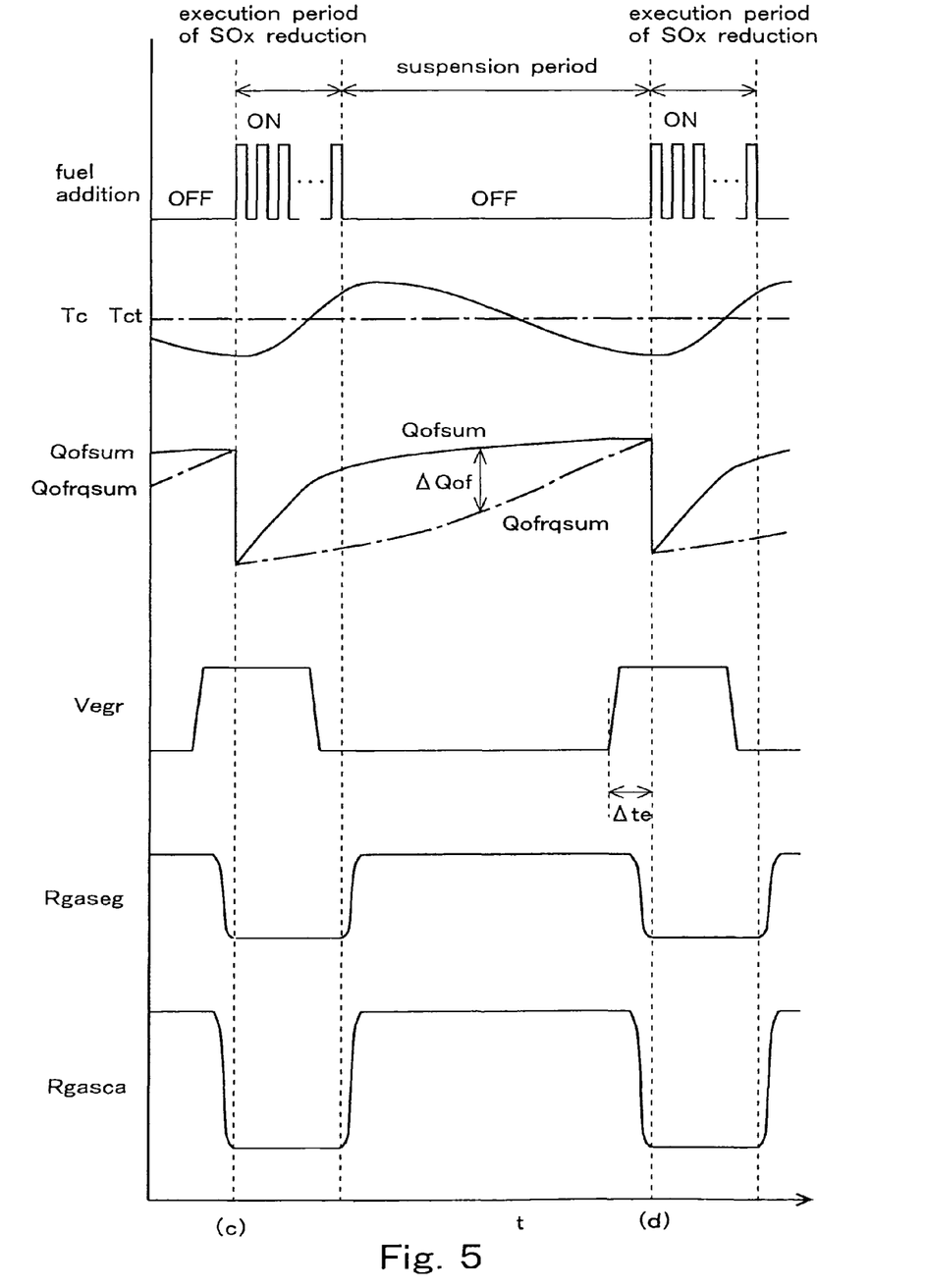
FIG. 5 is a time chart showing changes in the presence/absence of fuel addition through a fuel addition valve, the temperature of an NOx catalyst, the degree of opening of an EGR valve, the integrated oxidized fuel amount, the integrated required fuel amount, the air-fuel ratio of the engine exhaust gas, and the air-fuel ratio of the inflowing exhaust gas according to embodiment 3.

Here, a more specific method of the SOx reduction control according to this embodiment will be described with reference to the time chart shown in FIG. 5. FIG. 5 is a time chart showing the absence/presence of addition of fuel through the fuel addition valve 14 and changes in the temperature of the NOx catalyst 9, the degree of opening Vegr of the EGR valve 13, the integrated oxidized fuel quantity Qofsum, the integrated required fuel quantity Qofrqsum, the air-fuel ratio Rgaseg of the engine exhaust gas, and the air-fuel ratio Rgsca of the inflowing exhaust gas.

Here, the integrated oxidized fuel amount Qofsum is the integrated amount of the quantity of fuel oxidized in the NOx catalyst 9 since the time at which the SOx reduction control is executed (i.e. time (c) in FIG. 5). The integrated required fuel amount Qofrqsum is the integrated amount of the quantity of fuel that needs to be oxidized in the NOx catalyst 9 in order to make the temperature Tc of the NOx catalyst 9 equal to a target temperature Tct since the time at which the SOx reduction control is executed (i.e. time (c) in FIG. 5). The target temperature Tct is a value that allows a determination that SOx stored in the NOx catalyst 9 is reduced by executing the SOx reduction control to make the air-fuel ratio Rgasca of the inflowing exhaust gas sufficiently low if the average temperature of the NOx catalyst 9 during the execution period of the SOx reduction control and during the suspension period of the SOx reduction control is equal to the target temperature Tct. This target temperature Tct is determined in advance by, for example, experiments.

In the SOx reduction control, as shown in FIG. 5, addition of fuel to the exhaust gas through the fuel addition valve 14 is executed plural times intermittently. The period over which the intermittent addition of fuel through the fuel addition valve 14 is executed is determined in advance. During the execution period of the SOx reduction control, the integrated oxidized fuel amount Qofsum increases steeply, because fuel is supplied to the NOx catalyst 9. During the suspension period of the SOx reduction control, although addition of fuel to the exhaust gas through the fuel addition valve 14 is not executed, fuel that had adhered to the NOx catalyst 9 during the execution period of the SOx reduction control is oxidized. For this reason, the integrated oxidized fuel amount Qofsum increases also during the suspension period of the SOx reduction control, as long as oxidation of the fuel adhering on the NOx catalyst 9 proceeds. However, the increase rate of the integrated oxidized fuel amount Qofsum during the suspension period of the SOx reduction control is much lower than that during the execution period of the SOx reduction control.

During the execution period of the SOx reduction control, since oxidation of fuel in the NOx catalyst 9 is promoted, the temperature Tc of the NOx catalyst 9 rises steeply from a temperature lower than the target temperature Tct to become higher than the target temperature Tct. Thereafter, the temperature Tc of the NOx catalyst 9 falls gradually during the suspension period of the SOx reduction control to become lower than the target temperature Tct. After execution of the SOx reduction control has been started, the integrated required fuel amount Qofrqsum increases gradually during the execution period of the SOx reduction control and during the suspension period of the SOx reduction control.

In this embodiment, as the integrated oxidized fuel amount Qofsum and the integrated required fuel amount Qofrqsum change in the above described manner, the difference between the integrated oxidized fuel amount Qofsum and the integrated required fuel amount Qofrqsum decreases gradually during the suspension period of the SOx reduction control. At the time when the integrated oxidized fuel amount Qofsum and the integrated required fuel amount Qofrqsum become equal to each other (at time (d) in FIG. 5), the SOx reduction control is executed by lowering the air-fuel ratio Rgaseg of the engine exhaust gas and executing intermittent addition of fuel through the fuel addition valve 14. Here, the time at which the integrated oxidized fuel amount Qofsum and the integrated required fuel amount Qofrqsum become equal to each other will be referred to as the second specific time.

As described above, there is a response delay from the time when the EGR valve 13 is operated in the opening direction to the time when the air-fuel ratio Rgaseg of the engine exhaust gas becomes low. In view of this, in this embodiment, the second specific time is predicted based on the decrease rate of the difference ΔQof between the integrated oxidized fuel amount Qofsum and the integrated required fuel amount Qofrqsum, before the integrated oxidized fuel amount Qofsum and the integrated required fuel amount Qofrqsum become equal to each other. The EGR valve 13 is operated in the opening direction at a time earlier than the predicted second specific time by a time equal to the response delay time Ate taken until the air-fuel ratio Rgaseg of the engine exhaust gas becomes low since the EGR valve 13 is operated in the opening direction. The response delay time Ate has been determined in advance by, for example, experiments.

Thus, a state in which the air-fuel ratio Rgaseg of the engine exhaust gas is low is achieved at the second specific time. Then, intermittent addition of fuel to the exhaust gas by the fuel addition valve 14 is executed at the second specific time.

As a result, addition of fuel to the exhaust gas through the fuel addition valve 14 can be executed in synchronization with the time when the air-fuel ratio Rgaseg of the engine exhaust gas has been made low by operating the EGR valve 13 in the opening direction to increase the quantity of the EGR gas, as is the case with the NOx reduction control according to embodiment 1. In addition, the average temperature of the NOx catalyst 9 during the execution period of the SOx reduction control and the suspension period of the SOx reduction control can be made equal to the target temperature Tct, and the air-fuel ratio of the inflowing exhaust gas can be made sufficiently low at the time when the integrated oxidized fuel amount Qofsum and the integrated required fuel amount Qofrqsum become equal to each other, whereby the SOx stored in the NOx catalyst 9 can be reduced.

Thus, according to the present invention, while the period over which the air-fuel ratio of the air-fuel mixture in the internal combustion engine 1 is made low so as to decrease the air-fuel ratio of the Rgaseg of the engine exhaust gas can be made as short as possible, the air-fuel ratio Rgasca of the inflowing exhaust gas can be made sufficiently low. This enables reduction of SOx stored in the NOx catalyst 9 while preventing a decrease in fuel economy, an increase in harmful exhaust emission, and an increase in combustion noise from being caused by unduly long duration of the period over which the air-fuel ratio of the air-fuel mixture in the internal combustion engine 1 is made low.

<SOx Reduction Control Routine>

Figure 6:
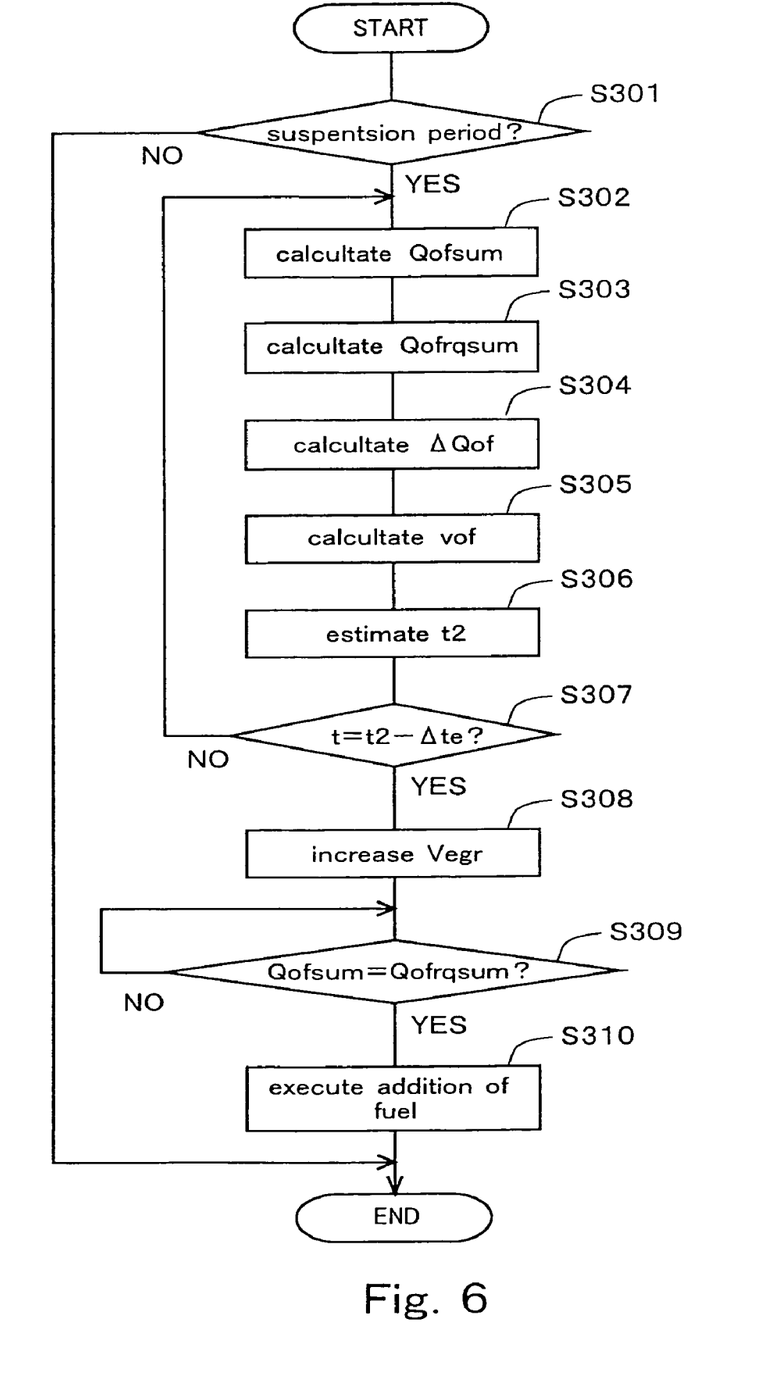
FIG. 6 is a flow chart of a routine of an SOx reduction control according to embodiment 3.

Here, a routine of the SOx reduction control according to this embodiment will be described with reference to the flow chart shown in FIG. 6. This routine is stored in the ECU 20 in advance, and executed at predetermined intervals during the operation of the internal combustion engine 1. In this embodiment, the ECU 20 that executes this routine corresponds to the reduction execution unit according to the present invention.

In this routine, first in step S301, the ECU 20 determines whether or not the SOx reduction control is in the suspension period. If the determination in step S301 is affirmative, the ECU 20 proceeds to step S302, and if the determination is negative, the ECU 20 once terminates execution of this routine.

In step S302, the ECU 20 calculates the integrated oxidized fuel amount Qofsum since the time of the last execution of the SOx reduction control. In this embodiment, the ECU 20 that executes this step S302 corresponds to the integrated oxidized reducing agent amount calculation unit according to the present invention.

Then, the ECU 20 proceeds to step S303, where it calculates the integrated required fuel amount Qofrqsum since the time of the last execution of the SOx reduction control. In this embodiment, the ECU 20 that executes this step S303 corresponds to the integrated required reducing agent amount calculation unit according to the present invention.

Then, the ECU 20 proceeds to step S304, where it subtracts the integrated required fuel amount Qofrqsum from the integrated oxidized fuel amount Qofsum to calculate the difference ΔQof between these values.

Then, the ECU 20 proceeds to step S305, where it calculates the decrease rate vof of the difference ΔQof between the integrated oxidized fuel amount Qofsum and the integrated required fuel amount Qofrqsum (which rate will be simply referred to as the "decrease rate", hereinafter).

Then, the ECU 20 proceeds to step S306, where it estimates the second specific time t2 defined as the time at which the integrated oxidized fuel amount Qofsum and the integrated required fuel amount Qofrqsum become equal to each other, based on the decrease rate vof. In this embodiment, the ECU 20 that executes this step S306 corresponds to the prediction unit according to the present invention.

Then, the ECU proceeds to step S307, where it determines whether or not the time earlier than the second specific time t2 estimated in step S306 by a time equal to the response delay time ate taken until the air-fuel ratio Rgaseg of the engine exhaust gas becomes low since the EGR valve 13 is operated in the opening direction is reached. If the determination in step S307 is affirmative, the ECU 20 proceeds to step. S308, and if the determination is negative, the ECU 20 returns to step S302.

In step S308, the ECU 20 increases the degree of opening Vegr of the EGR valve 13. In other words, the ECU 20 operates the EGR valve 13 in the opening direction. This leads to an increase in the quantity of the EGR gas introduced into the internal combustion engine 1 and a decrease in the air-fuel ratio of the air-fuel mixture in the internal combustion engine 1. In this embodiment, the ECU 20 that executes this step S308 corresponds to the combustion mode switching unit according to the present invention.

Then, the ECU 20 proceeds to step S309, where it determines whether or not the integrated oxidized fuel amount Qofsum and the integrated required fuel amount Qofrqsum have become equal to each other. In other words, the ECU 20 determines whether or not the second specific time t2 has been reached. If the determination in step S309 is affirmative, the ECU 20 proceeds to step S310, and if the determination is negative, the ECU 20 repeats the process of step S309.

In step S310, the ECU 20 executes intermittent addition of fuel to the exhaust gas through the fuel addition valve 14. Thereafter, the ECU 20 once terminates execution of this routine.

According to the above-described routine, when the air-fuel ratio of the air-fuel mixture in the internal combustion engine 1 is to be decreased in the SOx reduction control by increasing the quantity of the EGR gas, the EGR valve 13 is operated in the opening direction at such a timing earlier than the second specified time t2 as to make the air-fuel ratio Rgaseg of the engine exhaust gas low at the second specific time t2. Thus, the air-fuel ratio Rgaseg of the engine exhaust gas can be made low at the time when the integrated oxidized fuel amount Qofsum and the integrated required fuel amount Qofrqsum become equal to each other. In addition, addition of fuel through the fuel addition valve 14 can be executed in synchronization with the time when the air-fuel ratio Rgaseg of the engine exhaust gas becomes low.

While in the above-described embodiments 1 to 3 the low air-fuel ratio mode is achieved by operating the EGR valve 13 in the opening direction to increase the quantity of the EGR gas, there are other methods of achieving the low air-fuel ratio mode such as, for example, operating the throttle valve 10 in the closing direction to decrease intake air quantity, and advancing the timing of closing the exhaust valve of the internal combustion engine 1 to increase the quantity of burned gas (so-called internal EGR gas) staying in the cylinder. The low air-fuel ratio mode may be achieved by using these methods in combination.

In the above-described embodiments 1 to 3, the fuel addition valve 14 corresponds to the fuel supply unit according to the present invention. Instead of addition of fuel through the fuel addition valve 14, sub fuel injection may be executed in the internal combustion engine 1 at a time posterior to main fuel injection thereby supplying fuel injected by the sub fuel injection to the exhaust gas.

INDUSTRIAL APPLICABILITY

According to the present invention, oxides stored in an NOx catalyst can be reduced more preferably.

The invention claimed is:
1. An exhaust gas purification system for an internal combustion engine, comprising:
   an NOx storage reduction catalyst provided in an exhaust passage of the internal combustion engine;

combustion mode switching unit for switching a combustion mode of said internal combustion engine into a low air-fuel ratio mode in which the air-fuel ratio of air-fuel mixture in said internal combustion engine is lower than that in a normal combustion mode in which reduction of oxide stored in the NOx catalyst is not performed;

reducing agent supply unit for supplying reducing agent to exhaust gas flowing in said exhaust passage upstream of said NOx storage reduction catalyst;

reduction execution unit for executing an NOx reduction control to reduce NOx stored in said NOx storage reduction catalyst, integrated NOx discharge amount calculation unit for calculating an integrated NOx discharge amount defined as an integrated amount of the quantity of NOx discharged from said internal combustion engine since the time of last execution of the NOx reduction control; and prediction unit for predicting, based on a decrease rate of the difference between said integrated NOx discharge amount and a specific NOx discharge amount serving as a threshold of execution of the NOx reduction control, a specific time defined as a time at which said integrated NOx discharge amount reaches said specific NOx discharge amount, wherein said reduction execution unit executes the NOx reduction control by switching the combustion mode of said internal combustion engine into the low air-fuel ratio mode by said combustion mode switching unit with such timing, prior to the specific time predicted by said prediction unit, as to make the air-fuel ratio of the exhaust gas low at said specific time, and executing supply of reducing agent by said reducing agent supply unit at the specific time.

2. An exhaust gas purification system for an internal combustion engine according to claim 1, comprising specific NOx discharge amount setting unit for setting said specific NOx discharge amount in accordance with an operation state of said internal combustion engine, wherein when the decrease rate of the difference between said integrated NOx discharge amount and said specific NOx discharge amount is equal to or higher than a specific rate, switching of the combustion mode of said internal combustion engine into the low air-fuel ratio mode by said reduction execution unit is disabled.

3. An exhaust gas purification system for an internal combustion engine, comprising:

an NOx storage reduction catalyst provided in an exhaust passage of the internal combustion engine;

combustion mode switching unit for switching a combustion mode of said internal combustion engine into a low air-fuel ratio mode in which the air-fuel ratio of air-fuel mixture in said internal combustion engine is lower than that in a normal combustion mode in which reduction of oxide stored in the NOx catalyst is not performed;

reducing agent supply unit for supplying reducing agent to exhaust gas flowing in said exhaust passage upstream of said NOx storage reduction catalyst; and reduction execution unit for executing a SOx reduction control to reduce SOx stored in said NOx storage reduction catalyst;

integrated oxidized reducing agent amount calculation unit for calculating an integrated oxidized reducing agent amount defined as an integrated amount of the quantity of reducing agent oxidized in said NOx storage reduction catalyst since the time of last execution of the SOx reduction control;

integrated required reducing agent amount calculation unit for calculating an integrated required reducing agent amount defined as an integrated amount of the quantity of reducing agent that needs to be oxidized in said NOx storage reduction catalyst in order to make the temperature of said NOx storage reduction catalyst equal to a target temperature since the time of last execution of the SOx reduction control; and prediction unit for predicting a specific time defined as a time at which said integrated oxidized reducing agent amount and said integrated required reducing agent amount become equal to each other based on a decrease rate of the difference between said integrated oxidized reducing agent amount and said integrated required reducing agent amount, wherein said reduction execution unit executes the SOx reduction control by switching the combustion mode of said internal combustion engine into the low air-fuel ratio mode by said combustion mode switching unit with such timing, prior to the specific time predicted by said prediction unit, as to make the air-fuel ratio of the exhaust gas low at said specific time, and executing supply of reducing agent by said reducing agent supply unit at the specific time.

* * * * *